United States Patent
Marques et al.

(10) Patent No.: US 9,950,575 B2
(45) Date of Patent: Apr. 24, 2018

(54) MOUNTING PATCH FOR A TIRE

(71) Applicants: COMPAGNIE GENERALE DES ETABLISSEMENTS MICHELIN, Clermont-Ferrand (FR); Michelin Recherche et Technique S.A., Granges-Paccot (CH)

(72) Inventors: Frédéric Marques, Clermont-Ferrand (FR); Denis Lhospitalier, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 0 days.

(21) Appl. No.: 15/118,637

(22) PCT Filed: Mar. 18, 2015

(86) PCT No.: PCT/IB2015/000362
§ 371 (c)(1),
(2) Date: Aug. 12, 2016

(87) PCT Pub. No.: WO2015/140623
PCT Pub. Date: Sep. 24, 2015

(65) Prior Publication Data
US 2017/0059435 A1    Mar. 2, 2017

(30) Foreign Application Priority Data
Mar. 21, 2014   (FR) ..................... 14 00686

(51) Int. Cl.
*B60C 23/04*   (2006.01)
*G06K 19/077*  (2006.01)
(Continued)

(52) U.S. Cl.
CPC ...... *B60C 23/0415* (2013.01); *B29D 30/0061* (2013.01); *B60C 23/0438* (2013.01);
(Continued)

(58) Field of Classification Search
CPC ............ B60C 23/0415; B60C 23/0493; B60C 23/0438; B60C 23/0442
See application file for complete search history.

(56) References Cited

U.S. PATENT DOCUMENTS

| | | | |
|---|---|---|---|
| 2009/0058667 A1* | 3/2009 | Dixon ................. | B60C 23/0452 340/626 |
| 2012/0239313 A1 | 9/2012 | Champredonde et al. ..... | 702/50 |
| 2015/0191055 A1 | 7/2015 | Schumacher et al. ................... | B60C 23/0408 |

FOREIGN PATENT DOCUMENTS

| | | |
|---|---|---|
| DE | 10 2007 060 861 A1 | 6/2009 |
| EP | 0 925 959 A2 | 6/1999 |

(Continued)

*Primary Examiner* — Paul West
(74) *Attorney, Agent, or Firm* — Fitzpatrick, Cella, Harper & Scinto

(57) ABSTRACT

A rubber patch, which is useable for mounting an active electronic component to a tire, is described. The rubber patch includes a base having a connecting face and support face. The connecting face is substantially planar and is intended to be fixed to an internal surface of the tire. The support face is opposite the connecting face and is arranged to support the active electronic component. The rubber patch further includes a passive label arranged between the connecting face and the support face. The passive label is for identifying the tire and is provided with a memory for storing a unique identification data item pertaining to the tire. A corresponding tire monitoring system, which is configured to read at least the identification data item pertaining to the tire, also is described.

6 Claims, 4 Drawing Sheets

(51) Int. Cl.
*G01L 17/00* (2006.01)
*B29D 30/00* (2006.01)

(52) U.S. Cl.
CPC ...... *B60C 23/0442* (2013.01); *B60C 23/0449* (2013.01); *B60C 23/0483* (2013.01); *B60C 23/0493* (2013.01); *G01L 17/00* (2013.01); *G06K 19/07764* (2013.01); *B29D 2030/0072* (2013.01)

(56) References Cited

FOREIGN PATENT DOCUMENTS

| | | |
|---|---|---|
| FR | 2 950 691 A1 | 4/2011 |
| FR | 2 967 613 A1 | 5/2012 |
| JP | 2006-240598 A | 9/2006 |
| WO | WO 2011/039486 A2 | 4/2011 |
| WO | WO 2012/069515 A1 | 5/2012 |
| WO | WO 2014/041060 A1 | 3/2014 |

* cited by examiner

MOUNTING PATCH FOR A TIRE

TECHNICAL FIELD OF THE INVENTION

The present invention relates to a rubber patch for mounting an active electronic component for a tire. The patch comprises a base with a substantially planar connecting face intended to be fixed to the internal surface of a tire. It also comprises a support face able to act as a support for the said active electronic component. The invention also relates to a tire comprising, fixed to its internal surface, a mounting patch as described hereinabove.

PRIOR ART

Patent application WO2012/069515 proposes a device for fixing a module to the internal wall of a tire, consisting of a base secured to the tire and of a flexible strip. The base comprises means of fixing the strip and the ends of the flexible strip comprise at least two independent means of attachment of the module. The flexible strip is arranged removably in the base using two openings in the base through which the strip can pass. The flexible strip has three portions: a middle portion, made of bi-elastic fabric and two end portions each connected to the middle portion and made of hook-and-loop fabric. It may also be a single-component entity in the form of a strip of hook-and-loop fabric (a Velcro strip).

Document WO2011/039486 describes a pressure measuring component comprising a pressure measuring surface functionally connected to a test body and a sealed pressure-measurement casing in which the test body is arranged. The pressure measuring surface is borne by a deformable wall of the sealed pressure measuring casing extending some distance from the test body. The sealed pressure measuring casing delimits a space internal to the sealed casing. Means of transmitting pressure between the pressure measuring surface and the test body comprising a substantially incompressible material occupy the entirety of the internal space.

In the technologies described hereinabove, the sensors are removable and can be removed at any time from their fixing to a first tire so that they can subsequently be fixed to a tire, without any assurance that this is the same tire. Thus, if the data received from the sensors are analysed for the purposes of monitoring how the tires change over time, there is a risk that the monitoring will relate to more than one single tire, without there being any way of checking or being informed of this.

Also known is a system for monitoring tire pressures comprising an identification element incorporated into the tread of the tire that is to be monitored, a mount, placed against the internal wall of the tire, in line with the identification element, and to which a pressure sensor is fixed. The pressure sensor receives identification data from the element incorporated into the tire. This same sensor transmits out of the tire data regarding the pressure of the identified tire. This type of system involves firstly, modifying the design of the tire so as to allow the identification element to be incorporated and secondly modifying the method of manufacture of this tire in order to provide steps for incorporating the identification element. Aside from the significant costs elicited through these modifications, the fact of introducing steps of incorporating a small and particularly fragile component into a heavy and complex industrial process presents numerous difficulties that need to be overcome both in terms of quality assurance and in terms of industrial engineering in order to ensure that the process does not become excessively complex and expensive.

Document WO2014/041060 describes a system that allows car tire data to be stored in a sensor provided for that purpose. A system for the RFID transmission of data between a label of the tire and the sensor is provided. The system plans to detect the installation of the active sensor on its mount by means of electrical contacts. The electrical contacts in question are not incorporated into the mount. Rather, they protrude from the mount with a view to allowing electrical contact. When the contact is made, the sensor starts a reading of the identification data of the label. This reading through contact makes it possible to ensure that if the sensor is removed, a new reading operation is performed upon subsequent installation. Any change in pairing (ID-sensor) is therefore detected. This system is specifically designed for passenger vehicles: the electrical contacts of the sensor and of the mount are elements that are fragile and ill-suited to a rigorous environment such as that of the tires of civil engineering vehicles.

In order to alleviate these various disadvantages, the invention provides various technical means.

SUMMARY OF THE INVENTION

First of all, a first object of the invention is to provide a rubber or rubbery patch for mounting a sensor or electronics module allowing long-term use and in which the connection between the sensor and the tire can be checked and ensured.

Another object of the invention is to provide a system for monitoring tires without the risk of error regarding the identity of the tire.

Yet another object of the invention is to provide a tire monitoring system that makes it possible to ensure that the pressure and/or temperature data history obtained for a given tire is rigorously matched to this tire independently of any human intervention.

Yet another object of the invention is to provide a tire monitoring system that is particularly suited to very large-sized tires such as tires intended for civil engineering vehicles and/or for certain types of agricultural vehicle.

For that reason, the invention provides a rubber patch for mounting an active electronic component comprising a base with a substantially planar connecting face intended to be fixed to the internal surface of a tire and an opposite support face able to act as a support for the said active electronic component, comprising a passive label for identifying the corresponding tire, which is provided with a memory capable of storing a unique identification data item pertaining to this tire, the said passive label being integrated into the said patch, between the connecting face and the support face.

This design allows the passive label to be afforded optimum protection against any attack caused by use in the particularly harsh environment of civil engineering vehicle tires. In particular, this architecture makes it possible to protect the label from the liquids that may be introduced into the tires in order notably to protect the rim from rust, such as Tire Life® by the Fuller Brothers, Inc. company. The fully integrated label is well protected from any contact with or attack from this product.

There are found to be numerous advantages inherent to integrating a passive identification label into the active electronics module mounting patch. Furthermore, the reading distance between the active electronics module and the patch—passive identification label assembly is very short, well controlled, and very well suited to this way of exchanging data. This concept allows the passive identification label to be installed with perfect control over the industrial constraints because this installation within the patch is performed outside of the large tire manufacturing process which is ill-suited to incorporating a small and fragile component directly into the architecture of the tire.

Thus, the label is implanted during the patch manufacturing process. The latter is far better suited and presents lower risks in the implantation of small-sized fragile components. The only modification required to the tire manufacturing method regards the step of bonding the patches to the internal wall of the tire and the inputting of the unique identification data. Because these operations are carried out after the tire has been finished, they have no great impact on the manufacturing process. Finally, implanting the label in the electronics module mounting patch rather than directly in the tire means that the label can be located in the tire with no constraint as to its position.

According to one advantageous embodiment, the base comprises at least one strap affording two openings opposite one another so that a fixing strip for fixing the said active electronic component can pass and in which the said identification component is substantially aligned with the intended location of the fixing strip.

According to another advantageous embodiment, the said support face comprises a platform of a geometry designed to cooperate with a corresponding geometry of the said active electronic component so as to fix the said active electronic component.

The said platform is advantageously in the shape of a dovetail.

According to yet another advantageous embodiment, the said passive identification label comprises a radiofrequency identification transponder of RFID type (for example operating at UHF such as 800-900 MHz, at HF such as 13.56 MHz, or at low frequency (LF) such as 125 kHz).

The invention also provides a tire comprising, fixed to its internal surface, a patch for mounting an active electronic component, the said patch comprising a base with a substantially planar connecting face fixed to the surface of the said tire and a support face able to act as a support for the said active electronic component. The rubber patch comprises a passive label for identifying the tire comprising, written within a memory, a unique identification data item pertaining to the tire to which the patch is fixed, the said passive label being integrated into the said patch between the connecting face and the support face.

Advantageously, the said identification label comprises a passive radiofrequency identification transponder of RFID type, provided with antennas (for example operating at UHF such as 800-900 MHz, at HF such as 13.56 MHz, or at low frequency (LF) such as 125 kHz).

RFID transponders often have relatively short reading distances. For civil engineering vehicle tires which may have diameters of as much as 4 m, the distance may often prove insufficient to ensure reading if the transponder is, for example, located at the top, far away from the reader. According to the invention, the use of an active electronics module which itself has longer-range data transfer means, allows this limitation to be overcome.

Advantageously, the tire is designed to be mounted on civil engineering vehicles, particularly mining transport vehicles, or agricultural vehicles.

The invention also provides a method for manufacturing a tire such that it comprises a step of placing an active electronics module rubber mounting patch on the internal surface thereof. The patch has a substantially planar connecting face and a support face able to act as a support for the said active electronics module, and a passive identification label for identifying the tire which is positioned between the said two faces. The placement step is performed by bringing the connecting surface into contact with the internal surface of the tire. The method moreover provides a step of writing to a memory of the said identification label a unique identification data item pertaining to the tire to which the patch is fixed.

The method according to the invention makes it possible to guarantee good alignment between the active electronics module that measures and transfers tire physical parameters and the tire identification label (inserted into the patch), thereby ensuring that the system operates correctly. By contrast, the known method in which an identification component is inserted directly into the tire does not allow such alignment to be guaranteed or would require the incorporation of alignment steps that placed great constraints on the industrial manufacture of large-sized tires such as those considered.

The method according to the invention is simple to implement and requires no substantial modification to the industrial process already established for the manufacture of the tires. The tricky operations of incorporating the passive identification label are performed in an industrial environment well suited to the handling of fragile small-sized components, as compared with the industrial environment in which the very large-sized tires such as those intended for civil engineering vehicles are manufactured.

Advantageously, the said step of installing the said rubber patch on the surface of the said tire takes place before the said tire is vulcanized.

In an alternative form of embodiment, the said step of installing the said rubber patch on the surface of the said tire takes place after the said tire has been vulcanized.

The invention also provides an active electronics module for measuring and transferring physical tire parameters, comprising:
i) at least one sensor (for example a pressure or temperature sensor, a rev counter, preferably of wound type, etc.);
ii) a power supply (for example a battery and a temporary storage capacity (or "booster") to power the RFID reader for a fairly short period of time at a power that is high enough to ensure that it operates correctly);
iii) a data transmission module (for example a radio transmitter of the 433 MHz type) allowing the physical data received from the sensors to be transmitted to a remote receiver (for example a receiver situated on the vehicle or to a mobile reader or even to a fixed reader situated for example on a marker post along a path frequently traveled by the vehicle concerned such as in an operating zone such as a mine);
in which the measurement and transfer unit also comprises a tire identifier reader (125 kHz, 13.56 MHz or 800 MHz RFID reader) able to receive the identification data coming from a patch for a tire as described hereinabove.

This electronics module for measuring and transferring physical tire parameter data advantageously makes it possible:
to read the tire identifier:
either regularly;
or on demand via an interrogation module;
or in conjunction with a low-pressure or substantially zero pressure threshold test indicating that the tire and the sensor have potentially become separated from one another;

to store this identifier in a local or remote memory;

to transmit this identifier via a fairly long-range transmission frequency to a receiver on a vehicle, to a mobile reader or to a reading marker post;

to associate the measured physical tire parameters with the correct tire in a way that is certain, such as for example by associating these parameters (km, pressure, temperature, etc.) with the tire identifier of the patch connected to the tire on which the measurements have been taken;

to know how many km have been covered in each pressure and/or temperature range;

to check that the type of tire is suited to the type of vehicle.

The invention finally provides a tire monitoring system for a vehicle (or fleet of vehicles), comprising:

an active electronics module for measuring and transferring physical tire parameters, comprising:
  i) a pressure sensor;
  ii) a power supply;
  iii) a data transmission module allowing the physical data received from the sensor and from the identification label of the patch to be transmitted to a remote receiver;

a monitoring module able to receive from the active electronics module for measuring and transferring physical tire parameters, physical data pertaining to the condition or behaviour of the tire;

a rubber patch for mounting an active electronics module comprising a base with a substantially planar connecting face intended to be fixed to the internal surface of a tire and an opposite support face able to act as a support for the said active electronics module, comprising, arranged between the said two faces, a passive label for identifying the corresponding tire;

the said measurement and transfer active electronics module also comprising a reader of the tire identifier capable of receiving the identification data from the patch to which it is fixed, the said active electronics module being designed to take RFID readings from the passive label of the patch after detecting a drop in tire pressure down to substantially zero bar followed by a rise in pressure value up to a value substantially corresponding to the service pressure of the tire.

The system according to the invention makes it possible to detect the most probable instances in which the tires can be removed and makes provision for reading the identification data after the tire has been refitted and reinflated. As such instances are somewhat infrequent, the readings are taken only where necessary, thus making it possible to save battery energy reserves.

Advantageously, the passive label is integrated into the said patch between the connecting face and the support face.

Advantageously also, when the patch and the electronics module are mounted in the operating position, they are not in electrical contact with one another.

The "relay" function performed by the data transmission module makes it possible to broaden the scope for distribution of physical data in relation to the use and behaviour of the tires. For example, centralizing the data makes it possible to locate the tires used across various sites.

Given the high level of monitoring required in order to optimize the use of a fleet of civil engineering tires, obtaining assurance that the data do indeed correspond to the tire identified is a considerable technical advantage.

According to one advantageous embodiment, the tire physical parameter data are stored in a memory of the active electronics module for measuring and transferring tire physical parameters.

In an alternative form, the tire physical parameter data are stored in a memory of a remote data server.

Advantageously also, the system moreover comprises a remote control module (or "trigger") (a low-frequency one of the 125 kHz type) allowing commands to be sent to the active electronics module from a mobile unit or from interrogation modules installed on the vehicle.

DESCRIPTION OF THE FIGURES

All the embodiment details are given in the description which follows, supplemented by FIGS. 1 to 7 which are given solely by way of nonlimiting examples and in which.

DETAILED DESCRIPTION OF THE INVENTION

Figure 1:
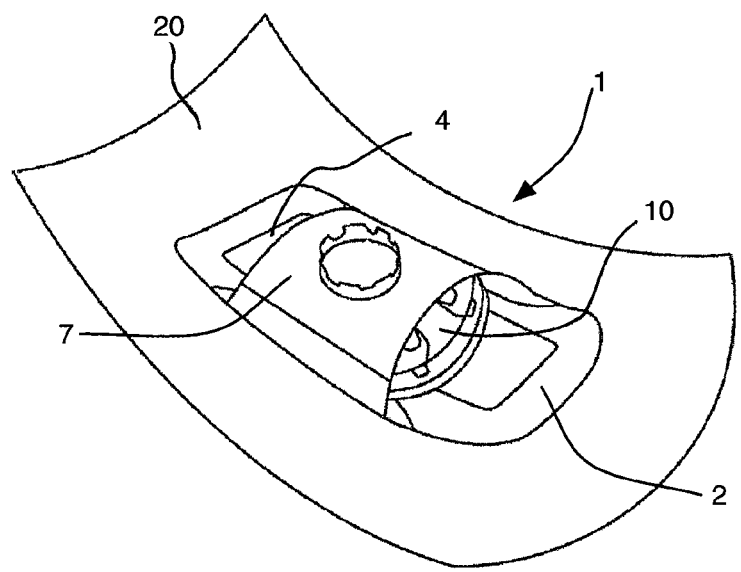
FIG. 1 is a perspective view of one example of a patch according to the invention, in which an active electronics module is placed.

FIG. 1 is a schematic depiction of one embodiment of a mounting patch 1 according to the invention, bonded permanently against an internal wall 20 of a tire. The figure shows a portion of the wall 20 or internal surface of a tire for the sake of simplifying the figure. A connecting face 3 (see FIGS. 3 and 4) of a base 2 of the patch 1, provided under the patch 1, acts as an adhesion interface between the patch and the internal surface of the tire intended to bear the patch. The connecting face is advantageously substantially planar and smooth, so as to promote adhesive contact between the two elements that are to be assembled.

Figure 3:
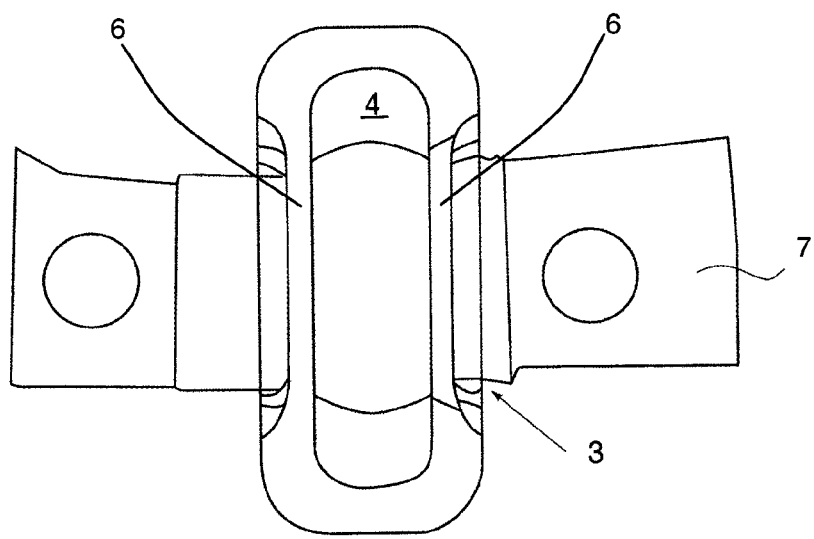
FIG. 3 is a plan view of the patch of FIG. 1.

The opposite side to the connecting face consists of a support face 4 against which an active electronics module 10 can be placed. In order to hold the active electronics module 10 on the support face 4, a flexible fixing strip 7 cooperates with the patch, as shown in FIG. 3. In the example illustrated, the fixing strip 7 is held by means of two substantially parallel straps 6 each creating an opening through which the fixing strip 7 is inserted. As an alternative, the straps 6 may be joined together by a common central portion.

Figure 2:
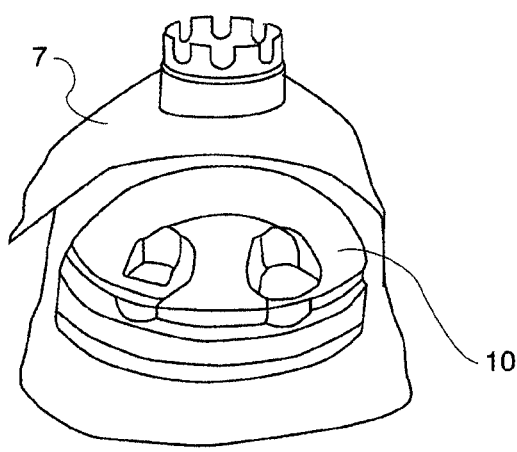
FIG. 2 is an elevation of one example of a patch according to the invention in which an active electronics module is placed.

FIG. 2 shows the mounting of an active electronics module 10 on a patch 1, with one side being held against the support face 4 of the patch and the other side held by means of the fixing strip 7 which goes right over the said electronics module 10. In the example illustrated, the fixing strip is held firmly by the insertion of a protruding portion of the module into openings specifically provided for this purpose on each side of the fixing strip 7, as can be clearly seen in FIGS. 1 and 2.

In one advantageous embodiment, the ends of the flexible strip comprise at least two independent module securing means. The flexible strip is arranged removably in the base by passing under two openings in the base which are there for the passage of the strip. This flexible strip is advantageously a single-component strip in the form of a strip of hook-and-loop fabric (Velcro strip). As an alternative, the flexible strip has three portions: a middle portion, made of bi-elastic fabric and two end portions each connected to the middle portion and made of hook-and-loop fabric.

Without departing from the scope of the invention, the patch 1, the fixing strip 7 and the electronics module 10 may have respective shapes and arrangements that differ from those illustrated in the figures.

Figure 4:
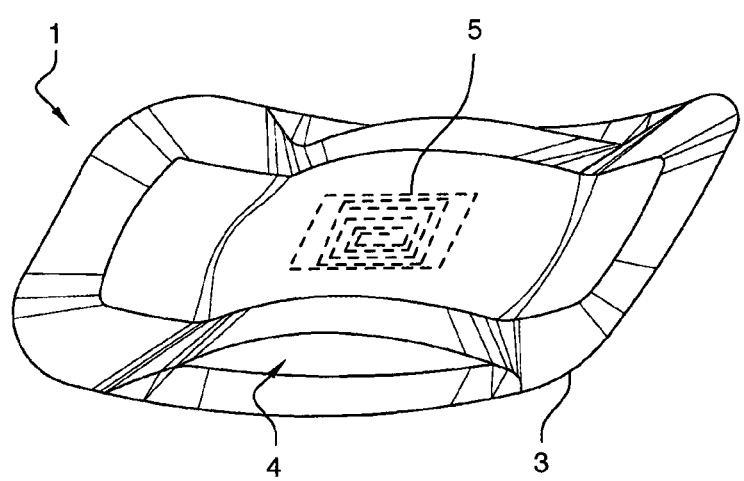
FIG. 4 is a perspective view of the patch of FIG. 1, showing an integrated label.

FIG. 4 shows a passive identification label 5 provided in this example under the support face 4, between the straps 6 of the patch. The label 5 advantageously comprises a memory used to store a unique identification data item pertaining to the tire against which the patch is fixed. As described later on, the identification is advantageously assigned at the moment that the patch is fixed to the associated tire. The two elements are preferably fixed together so that the fixing is permanent, in order to ensure that the tire identification remains associated with the same tire throughout the life thereof.

The passive identification label preferably comprises a radiofrequency identification transponder (of known type). This type of identification without an inbuilt power supply offers great durability at low cost, ensuring that the identification of the associated product will last. It also offers good integrity and durability despite the very harsh environment in which civil engineering vehicle or agricultural vehicle tires are used.

Figure 5:
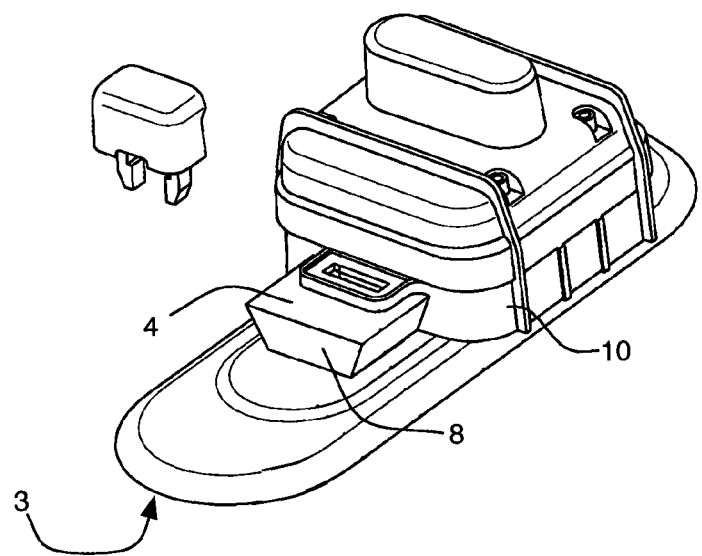
FIG. 5 is a perspective view of another example of patch according to the invention, in which an alternative form of the active electronics module is placed.
Figure 6:
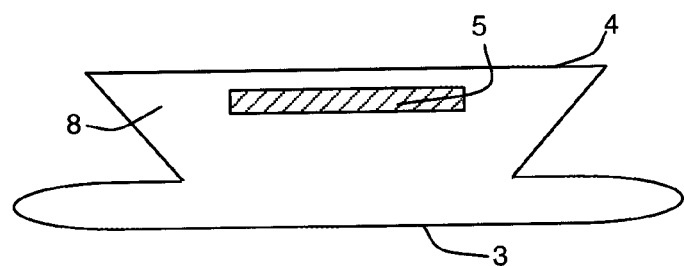
FIG. 6 is an elevation of the patch of FIG. 5 showing the integration of a label into the platform of the patch.

FIGS. 5 and 6 show an alternative form of embodiment in which the electronics module 10 is fixed by a platform 8 with a dovetail profile intended for insertion into one of the faces of the electronics module in which face a corresponding dovetail profile is provided. The two complementing elements are fixed together by sliding the electronics module 10 axially along the platform 8, as shown for example in FIG. 5. In this alternative form of embodiment, the passive identification label 5 is provided on the upper face of the platform 8. As an alternative, the label is integrated within the platform. These figures also show an example of an electronics module having a profile or configuration differing from the example of FIGS. 1 to 4.

The active electronics module 10, whatever its external configuration, comprises a reader of the tire identification which is specifically designed to receive identification data coming from a passive identification label 5 integrated into a patch 1.

Because the RFID reading of a passive electronic label of the tire consumes a great deal of energy at the reader, it is advantageous to reduce the number of label readings in order to extend the life of the battery of the active electronics module. For example, a number of between 5 and 15, and preferably of around 10 reading operations is enough to ensure the functions of the system while at the same time ensuring that the reader battery will have sufficient battery life.

Furthermore, according to the invention, when considering that applying an active electronics module 10 of a mounting patch 1 requires external manipulation, and therefore the removal of the tire, one of the solutions for keeping the number of readings down to the lowest possible number is to take label readings when the pressure sensor of the active electronics module detects a pressure substantially equal to 0 bar, signifying that the tire and the sensor may potentially have become detached from one another as a result of a removal of the tire. The reading of the label data is therefore taken after the tire has been refitted, when the pressure detector measures a pressure value substantially corresponding to the service pressure, signifying that the tire is correctly fitted and ready for use.

Figure 7:
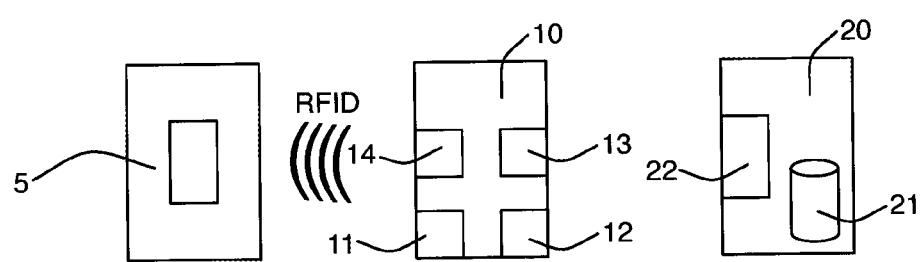
FIG. 7 is a schematic depiction of one embodiment of a tire monitoring system according to the invention.

FIG. 7 is a schematic depiction of one exemplary embodiment of a tire monitoring system for a vehicle of civil engineering type such as transport vehicles for mines. The system comprises an active electronics module 10 for taking measurements of the physical parameters of the tires and for sending the gathered data to a monitoring module 20.

The active electronics module 10 comprises a pressure sensor 11, a power supply 12 and a data transmission module 13 for transmitting the data to the monitoring module 20. It also comprises an RFID reading module 14 designed to activate the passive identification label 5 of the tire. Because this passive identification label 5 is integrated into the patch that is used to mount the active electronics module 10, the RFID reading module 14 is thus advantageously situated in the immediate vicinity of the label it is to interrogate. The operation of reading the data from the label 5 is thus far more reliable. The electrical power consumption required is optimized. The risks of reading error are practically eliminated.

The active electronics module advantageously comprises other sensors making it possible to measure other parameters such as the temperature, humidity, the number of revolutions performed, etc.

The monitoring module 20 comprises a data receiving module 22 designed to receive data coming from one or more active electronic modules 10. A database 21 of tire parameters allows the data of use in performing active, preventive and statistical tire monitoring to be stored.

The invention claimed is:

1. A tire monitoring system for a vehicle or for a fleet of vehicles, the system comprising:
    an active electronics module for measuring at least one physical parameter of a tire and for transmitting data relating to a physical condition of the tire; and
    a rubber patch for mounting an active electronics module to an internal tire surface; and
    a monitoring module for receiving, from the active electronics module, physical data pertaining to a condition or a behaviour of the tire,
    wherein the rubber patch includes:
        a base having a connecting face, which is substantially planar and intended to be fixed to the internal tire surface, and a support face located opposite the connecting face, the support face intended to serve as a support for the active electronics module, and
        a passive label for identifying the tire, the passive label being positioned between the connecting face and the support face,
    wherein the active electronics module includes:
        a pressure sensor,
        a power supply,
        a reader for obtaining identification data from the rubber patch, the reader being configured to perform RFID readings from the passive label to obtain the identification data after detecting a drop in tire pressure down to substantially zero bar followed by a rise in tire pressure value up to a value substantially corresponding to a service pressure of the tire, and a data transmitter for transmitting physical data received from the pressure sensor and the identification data obtained from the passive label to a remote receiver.

2. The tire monitoring system according to claim 1, wherein the passive label is integrated into the base between the connecting face and the support face.

3. The tire monitoring system according to claim 1, wherein, when the rubber patch and the active electronics module are mounted in an operating position, the rubber patch is not in electrical contact with the active electronics module.

4. The tire monitoring system according to claim 1, wherein the active electronics module further includes a memory for storing data of the at least one physical parameter of the tire.

5. The tire monitoring system according to claim 1, wherein the physical data transmitted from the data transmitter of the active electronics module is stored in a memory of the remote server.

6. The tire monitoring system according to claim 1, further comprising a remote controller for sending commands to the active electronics module from a mobile apparatus or from an interrogation apparatus installed on a vehicle.

* * * * *